US010485189B2

United States Patent
Kaye et al.

(10) Patent No.: US 10,485,189 B2
(45) Date of Patent: Nov. 26, 2019

(54) TIMBER-WORKING DEVICE AND METHOD OF OPERATION

(71) Applicant: WARATAH NZ LIMITED, Tokoroa (NZ)

(72) Inventors: Brett James Kaye, Tauranga (NZ); Alex James Stevenson, Papamoa (NZ); Justyn Peter Smythe, Cambridge (NZ)

(73) Assignee: WARATAH NZ LIMITED, Tokoroa (NZ)

( * ) Notice: Subject to any disclaimer, the term of this patent is extended or adjusted under 35 U.S.C. 154(b) by 990 days.

(21) Appl. No.: 14/704,807

(22) Filed: May 5, 2015

(65) Prior Publication Data

US 2015/0319939 A1    Nov. 12, 2015

(30) Foreign Application Priority Data

May 7, 2014    (NZ) ........................................ 624648

(51) Int. Cl.
*A01G 23/02*    (2006.01)
*A01G 23/00*    (2006.01)
*A01G 23/083*    (2006.01)

(52) U.S. Cl.
CPC ............ *A01G 23/02* (2013.01); *A01G 23/003* (2013.01); *A01G 23/083* (2013.01)

(58) Field of Classification Search
CPC ..... A01G 23/003; A01G 23/02; A01G 23/083
See application file for complete search history.

(56) References Cited

U.S. PATENT DOCUMENTS 3,688,821 A * 9/1972 McColl ................. A01G 23/08
144/208.8
4,672,006 A * 6/1987 McGraw ................ B27L 11/08
100/131

(Continued)

FOREIGN PATENT DOCUMENTS

DE    3112573    6/1982
DE    102011108816    1/2013

(Continued)

OTHER PUBLICATIONS

Southstar QuadStar 500 Brochure, http://southstarequipment.com/products/quadstar500/.

*Primary Examiner* — Robert E Fennema
*Assistant Examiner* — Chad G Erdman
(74) *Attorney, Agent, or Firm* — Klintworth & Rozenblat IP LLP

(57) ABSTRACT

A timber-working device comprises a frame having a feed axis and a drive system configured to feed at least one stem along the feed axis. The drive system comprises a first drive arm pivotally attached to the frame on a first side of the feed axis, having a first rotary drive having a first wheel. A second drive arm is also pivotally attached to the frame on a second side of the feed axis, having a second rotary drive having a second wheel. The drive system also comprises a third rotary drive having a third wheel, and a fourth rotary drive having a fourth wheel, mounted on the frame on the first and second sides of the feed axis respectively. At least one processor controls operation of the rotary drives, such that in a first mode the speed of the respective wheels of the rotary drives on the same side of the feed axis is substantially the same, and in a second mode the speed of the respective wheels of at least two rotary drives on opposing sides is substantially the same.

9 Claims, 8 Drawing Sheets

(56) References Cited

U.S. PATENT DOCUMENTS

| | | | | |
|---|---|---|---|---|
| 5,954,105 A | * | 9/1999 | Smith | A01G 23/095 |
| | | | | 144/248.5 |
| 9,232,701 B1 | * | 1/2016 | Peterson | A01G 23/083 |
| 2005/0098231 A1 | | 5/2005 | Alftan | |
| 2006/0278305 A1 | * | 12/2006 | Barlow | A01G 23/095 |
| | | | | 144/4.1 |
| 2007/0125447 A1 | * | 6/2007 | Alfthan | A01G 23/095 |
| | | | | 144/343 |
| 2010/0313997 A1 | * | 12/2010 | Quirke | A01G 23/093 |
| | | | | 144/4.1 |
| 2014/0060701 A1 | * | 3/2014 | Van De Mortel | |
| | | | | A01G 23/0955 |
| | | | | 144/341 |
| 2016/0143230 A1 | * | 5/2016 | Lundgren | A01G 23/08 |
| | | | | 144/4.1 |

FOREIGN PATENT DOCUMENTS

| | | |
|---|---|---|
| FI | 97340 B | 8/1996 |
| FI | 101868 B | 9/1998 |
| FI | 119901 | 5/2009 |

\* cited by examiner

TIMBER-WORKING DEVICE AND METHOD OF OPERATION

CROSS-REFERENCE TO RELATED APPLICATION(S)

This application claims priority to New Zealand patent application No. 624648, which was filed May 7, 2014.

STATEMENT OF FEDERALLY SPONSORED RESEARCH OR DEVELOPMENT

Not applicable.

FIELD OF THE DISCLOSURE

The present disclosure relates to a timber-working device and method of operation.

BACKGROUND OF THE DISCLOSURE

It is well-known to mount timber-working devices, often referred to as forestry or harvester heads, to a carrier vehicle in order to perform a number of operations in connection with timber processing. These operations may include one, or a combination of, grappling and felling a standing tree, delimbing a felled stem, debarking the stem, and cutting the stem into logs (known as bucking)—commonly using at least one chainsaw.

More recently, some forestry heads have been configured for processing multiple stems at a time; including the ability to feed stems through the head independently from each other by operating feed wheels on respective sides of the head. However, in situations where it is desirable to feed the stems together, independent operation can lead to misalignment of the ends of the stems. This can impact on the accuracy of length measurements made during simultaneous feeding of stems, resulting in less than optimal processing and therefore lost value.

The present disclosure, among other things, addresses the aforementioned problems.

SUMMARY OF THE DISCLOSURE

According to an exemplary embodiment of the disclosure there is provided a timber-working device. The timber-working device comprises a frame having a feed axis. The timber-working device further comprises a drive system configured to feed at least one stem along the feed axis. The drive system comprises a first drive arm pivotally attached to the frame on a first side of the feed axis, having a first rotary drive having a first wheel. The drive system also comprises a second drive arm pivotally attached to the frame on a second side of the feed axis, having a second rotary drive having a second wheel. The drive system also comprises a third rotary drive mounted on the frame on the first side of the feed axis, and having a third wheel. The drive system also comprises a fourth rotary drive mounted on the frame on the second side of the feed axis, and having a fourth wheel. The timber-working device also comprises at least one processor configured to control operation of the rotary drives, such that in a first mode the speed of the respective wheels of the rotary drives on the same side of the feed axis is substantially the same. The at least one processor is also configured to control operation of the rotary drives, such that in a second mode the speed of the respective wheels of at least two rotary drives on opposing sides is substantially the same.

According to an exemplary embodiment there is provided a method for controlling operation of a timber working device having a frame comprising a feed axis, a drive system comprising a first drive arm pivotally attached to the frame on a first side of the feed axis, comprising a first rotary drive having a first wheel, a second drive arm pivotally attached to the frame on a second side of the feed axis, comprising a second rotary drive having a second wheel, a third rotary drive mounted on the frame on the first side of the feed axis, and having a third wheel, and a fourth rotary drive mounted on the frame on the second side of the feed axis, and having a fourth wheel. The method comprises the steps of receiving a signal indicating selection of a first mode or second mode for operation of the rotary drives. If the first mode is selected, the rotary drives are controlled such that the speed of the respective wheels of the rotary drives on the same side of the feed axis is substantially the same. If the second mode is selected, the rotary drives are controlled such that the speed of the respective wheels of at least two rotary drives on opposing sides is substantially the same.

According to an exemplary embodiment of the present disclosure there is provided an article of manufacture having computer storage medium storing computer readable program code executable by a computer to implement a method for controlling operation of a timber working device having a frame comprising a feed axis, a drive system comprising a first drive arm pivotally attached to the frame on a first side of the feed axis, comprising a first rotary drive having a first wheel, a second drive arm pivotally attached to the frame on a second side of the feed axis, comprising a second rotary drive having a second wheel, a third rotary drive mounted on the frame on the first side of the feed axis, and having a third wheel, and a fourth rotary drive mounted on the frame on the second side of the feed axis, and having a fourth wheel. The code comprises computer readable program code receiving a signal indicating selection of a first mode or second mode for operation of the rotary drives. The code also comprises computer readable program code controlling, if the first mode is selected, the rotary drives such that the speed of the respective wheels of the rotary drives on the same side of the feed axis is substantially the same. The code also comprises computer readable program code controlling, if the second mode is selected, the rotary drives such that the speed of the respective wheels of at least two rotary drives on opposing sides is substantially the same.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
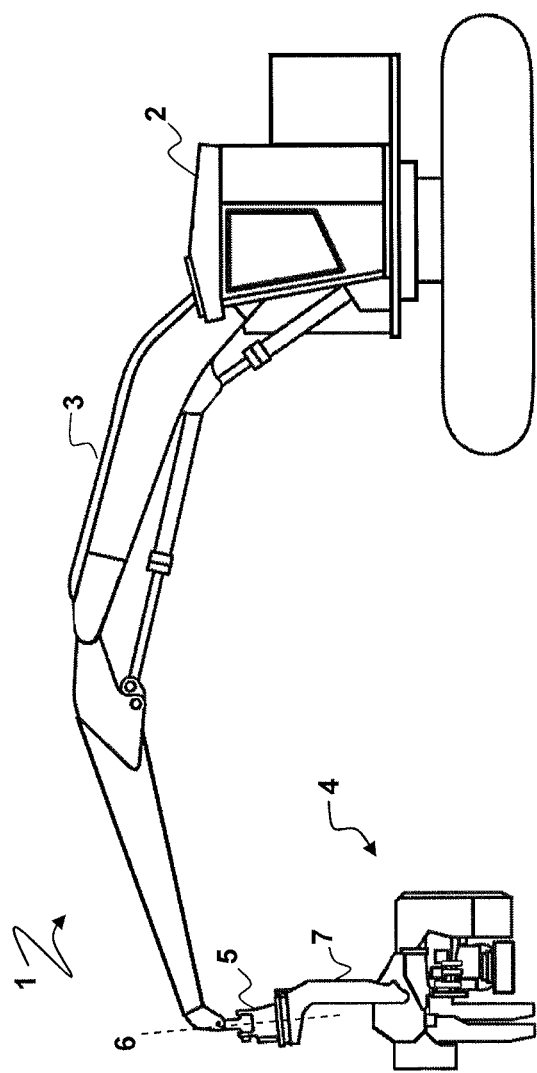
FIG. 1 is a side view of an exemplary timber-working system comprising, for example, a forestry head according to one aspect of the present disclosure.

The following describes one or more example embodiments of the disclosed timber-working device and method of operation, as shown in the accompanying figures of the drawings described briefly above. Various modifications to the example embodiments may be contemplated by one of skill in the art.

Throughout this specification, the word "comprise" or "include", or variations thereof such as "comprises", "includes", "comprising" or "including" will be understood to imply the inclusion of a stated element, integer or step, or group of elements integers or steps, but not the exclusion of any other element, integer or step, or group of elements, integers or steps.

The timber-working device may be a forestry or harvester head, and may be referred to as such throughout the specification. Forestry heads typically have the capacity to grapple and fell a standing tree, delimb and/or debark a felled stem, and cut the stem into logs. However, a person skilled in the art should appreciate that the present disclosure may be used with other timber-working devices, and that reference to the timber-working device being a forestry head is not intended to be limiting.

The rotary drive may be any suitable actuator for producing rotary motion as known to a person skilled in the art. In some embodiments, the rotary drives may be fluid driven— such as hydraulic motors.

In an embodiment, the device may comprises a hydraulic system. The system may comprise a first hydraulic circuit connecting the first and third rotary drives in series. The system may also comprise a second hydraulic circuit connecting the second and fourth rotary drives in series. The system may also comprise a first controllable valve connected between the first and second hydraulic circuits.

Reference to a controllable valve may be any suitable device known to a person skilled in the art for selectively enabling fluid communication through at least one passage. For example, the controllable valve may be at least one logic valve, or a solenoid valve.

The first and third rotary drives may be connected to a first feed valve, for example a four way valve, configured to selectively connect the drives to a source of fluid pressure and a reservoir. Similarly, the second and fourth rotary drives may be connected to a second feed valve.

It should be appreciated that one or more of the first feed valve, second feed valve, or controllable valve may be combined in a valve bank. Similarly, additional valves may be provided in order to achieve the various arrangements desired.

Together, the feed valves and controllable valve may be controlled to: connect the first and third rotary drives in series to enable feeding of a stem held by their respective wheels along the feed axis in forward or reverse; connect the second and fourth rotary drives in series to enable feeding of a stem held by their respective wheels along the feed axis in forward or reverse; connect the first and fourth rotary drives in series when feeding multiple stems simultaneously; and connect the second and third rotary drives in series when feeding multiple stems simultaneously.

By driving the first and fourth, and/or second and third rotary drives together during feeding of multiple stems, particularly two side by side, the stems are more likely to be driven at the same speed and therefore maintain alignment. This may assist in accounting for variation between the stems in terms of diameter, straightness or bark covering— which might otherwise cause disparate operation of the rotary drives due to loss of traction of one wheel in comparison with the other.

The timber-working device may comprise a distance measuring device. For example, the distance measuring device may be a measuring wheel as known in the art. The measuring wheel may be brought into contact with a stem, and an encoder used to determine its revolutions and therefore length of stem driven relative to the measuring wheel.

Where multiple stems are being driven in the same direction at the same time, the output from the measuring wheel may be used to infer length of both stems. Using the second mode of rotary drive control may assist in maintaining alignment of the stems and therefore accuracy of the measurement.

In an embodiment, controlling the rotary drives may comprise: receiving a signal indicative of the speed of each wheel; comparing the speeds of the respective rotary drives to determine speed differential; and if the speed differential is above a predetermined threshold, controlling operation of one or more of the rotary drives such that the speed differential is reduced.

Reference to an indication of speed should be understood to mean any measurement by which speed may be determined, inferred, or calculated. In an exemplary embodiment, the indication of speed may be rotation of a rotary drive, and therefore its associated wheel, over time. Given known geometry of components of the device, particularly the diameter of the wheels, the linear speed of the wheels may then be determined. For example, linear speed of a wheel may be determined as follows: Speed=Wheel Circumference*Revolutions per Minute.

Determination of rotation of the rotary drive may be achieved using any suitable means known to a person skilled in the art. For example, a rotary encoder may be provided for each rotary drive. The encoder may operate, for example, using mechanical, optical, magnetic, or capacitive principles to determine rotation of the portion of the drive to which the wheel is mounted and output a signal indicative of rotation. It should be appreciated that reference to rotation of the rotary drive may comprise partial rotation of the wheel, and/or number of complete revolutions.

In embodiments in which speed differential is used to control operation of the rotary drives, It should be appreciated that the rotary drives need not be fluid driven, but may operate using another power source—for example an electric rotary drive.

The various illustrative logical blocks, modules, circuits, and algorithm steps described in connection with the embodiments disclosed herein may be implemented as electronic hardware, computer software, or combinations of both. In particular, they may be implemented or performed with a general purpose processor such as a microprocessor, or any other suitable means known in the art designed to perform the functions described.

The steps of a method or algorithm and functions described in connection with the embodiments disclosed herein may be embodied directly in hardware, in a software module executed by a processor, or in a combination of the two. If implemented in software, the functions may be stored as processor readable instructions or code on a tangible, non transitory processor-readable medium—for example Random Access Memory (RAM), flash memory, Read Only Memory (ROM), hard disks, a removable disk such as a CD ROM, or any other suitable storage medium known to a person skilled in the art. A storage medium may be connected to the processor such that the processor can read information from, and write information to, the storage medium.

FIG. 1 illustrates a timber-working system comprising a carrier 1 for use in forest harvesting. The carrier 1 comprises an operator cab 2 from which an operator (not shown) controls the carrier 1. The carrier 1 further comprises a boom assembly 3, to which a timber-working device in the form of a forestry head 4 is connected.

Connection of the head 4 to the arm 3 comprises a rotator 5, configured to rotate the head 4 about the generally vertical axis of rotation marked by dashed line 6. A tilt bracket 7 further allows rotation of the head 4 between a prone position (as illustrated) and a standing position.

Figure 2:
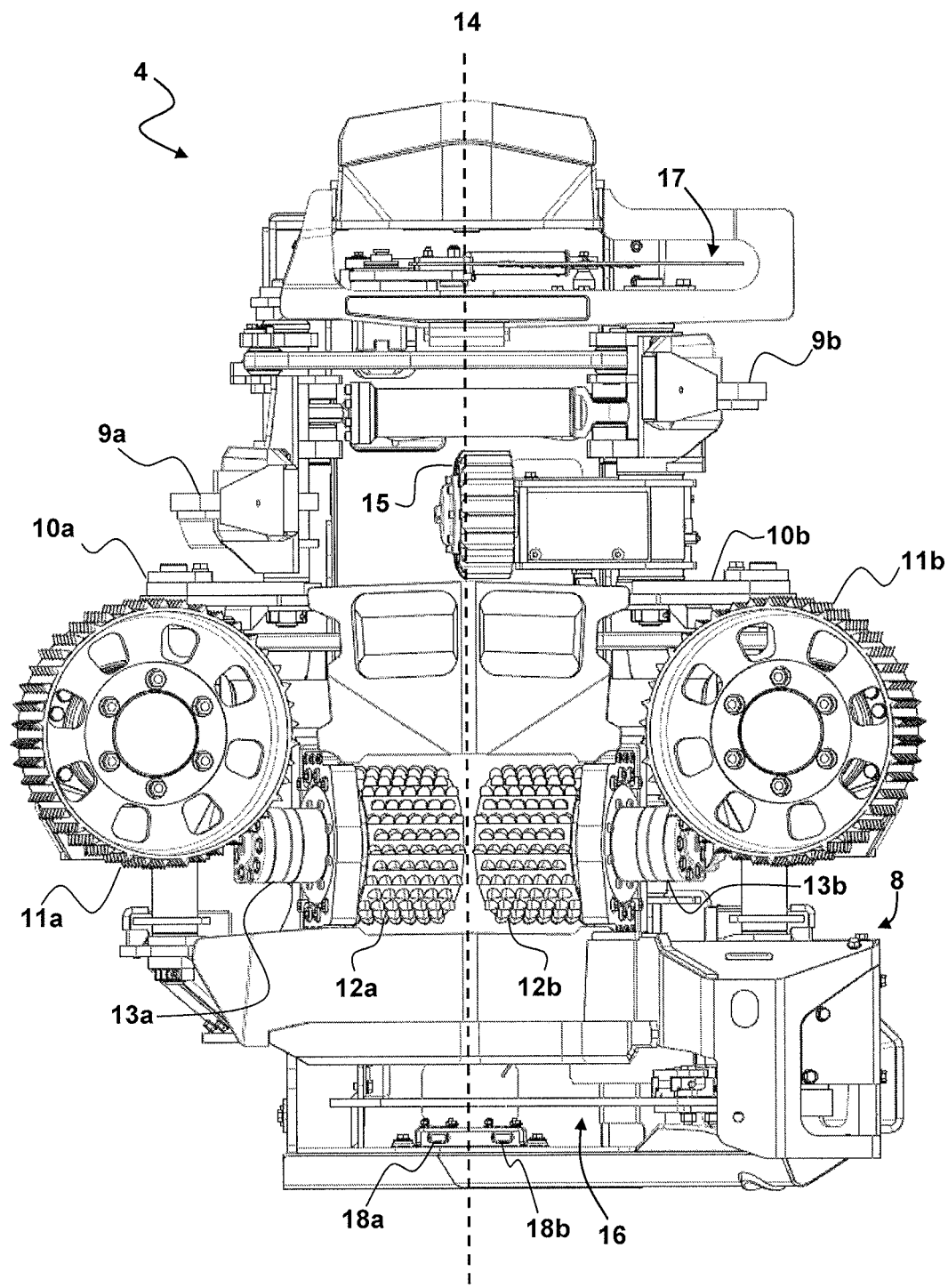
FIG. 2 is an elevated view of the forestry head.

Referring to FIG. 2, the head 4 comprises a frame 8 to which the tilt bracket 7 of FIG. 1 is pivotally attached. Right hand (RH) and left hand (LH) delimb arms 9a and 9b are pivotally attached to the frame 8, as are opposing RH and LH feed arms 10a and 10b. RH and LH feed wheels 11a and 11b are attached to RH and LH feed arms 10a and 10b respectively via associated rotary drives (not illustrated in FIG. 2). RH and LH frame-mounted feed wheels 12a and 12b are driven by RH and LH frame mounted drives 13a and 13b, which together with feed wheels 11a and 11b may be controlled to feed one or more stems (not illustrated) along feed axis 14 of the head 4. Feed wheels 11a, 11b, 12a and 12b and their associated rotary drives may collectively be referred to as the 'feed system.' A measuring wheel 15 may be lowered to come in contact with a passing stem in order to measure length.

A main chainsaw 16, and a topping chainsaw 17, are attached to the frame 8. The main saw 16 is typically used to fell a tree when the head 4 is in a harvesting position, and to buck stems into logs in the processing position of the head 4 (as seen in FIG. 1). The topping saw 17 may be used to cut off a small-diameter top portion of the stem(s) to maximize the value recovery of the trees.

RH and LH optical sensors 18a and 18b are attached to the frame 8 on either side of the feed axis 14. These sensors 18a and 18b may be used to detect the respective ends of stems held by the head 4.

Figure 3:
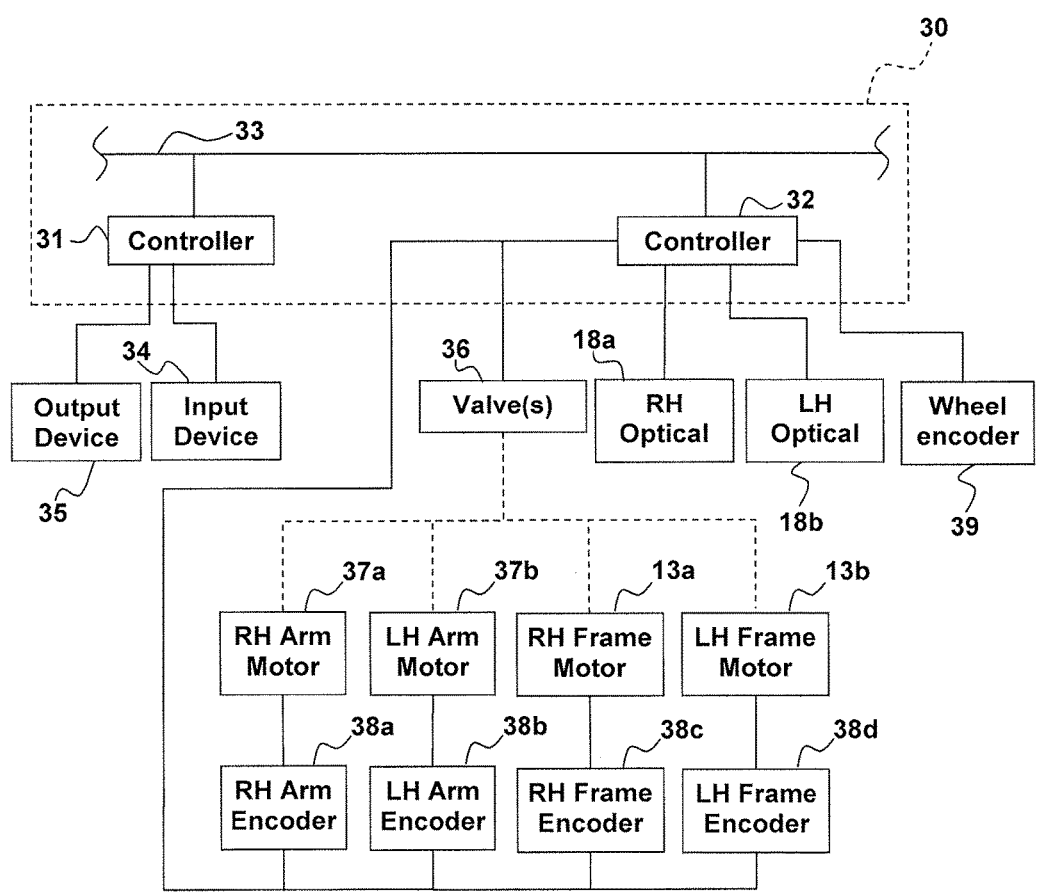
FIG. 3 is a diagrammatic view of an exemplary control system for the timber-working system.

The various operations of the head 4 may be controlled by the operator using hand and foot controls as known in the art. Further, certain automated functions of the harvester head 4 may be controlled by an electronic control system 30 as shown by FIG. 3. Description of the electronic control system 30 may comprise reference to features of FIG. 1 and/or FIG. 2.

The control system 30 comprises one or more electronic controllers, each controller comprising a processor and memory having stored therein instructions which, when executed by the processor, causes the processor to perform the various operations of the controller.

For example, the control system 30 comprises a first controller 31 on board the carrier 1 and a second controller 32 on board the head 4. The controllers 31, 32 are connected to one another via a communications bus 33 (e.g., a CAN bus).

A human operator operates an operator input device 34, for example hand and foot controls, located at the operator's cab 2 of the carrier 1 to control the head 4. Details of operation are output to an output device 35—for example a monitor. Certain automated functions may be controlled by first controller 31 and/or second controller 32.

The RH and LH optical sensors 18a and 18b are electronically coupled to the second controller 32, and configured to output respective signals indicative of the end of a stem being present within the respective sensing regions associated with the sensors 18a and 18b.

The head 4 has a number of valves 36 arranged, for example, in a valve block and coupled electrically to the second controller 32 so as to be under its control. The valves 36 comprise, for example, drive valves configured to control operation of the hydraulic motors 37a and 37b associated with the RH and LH feed wheels 11a and 11b, and the RH and LH frame mounted drives 13a and 13b associated with RH and LH frame-mounted feed wheels 12a and 12b.

The valves 36 further comprise drive valves for controlling operation of the saws 16 and 17.

Rotary encoders 38a, 38b, 38c and 38d may be associated with rotary drives 37a, 37b, 13a, and 13b respectively, and electronically coupled to the second controller 32. It should be appreciated that, in some embodiments, encoders may not be provided for each rotary drive—i.e. only one drive on each side may be provided with an encoder.

Each rotary encoder 38a, 38b, 38c and 38d is configured to output a signal indicative of rotation of the drives 37a, 37b, 13a, and 13b and thus feed wheels 11a, 11b, 12a and 12b. For known wheel diameters, the length of a stem driven by the wheels may be determined by multiplying the rotation value by the wheel circumference. It should be appreciated that the value of the rotations in a reverse direction may be subtracted from rotations in a forward direction to determine the length ultimately traversed.

A measuring wheel encoder 39 is electrically coupled to the second controller 32, and configured to output a measuring signal indicating the length of the stem(s) that has passed the measuring wheel 15 when lowered.

Figure 4A:
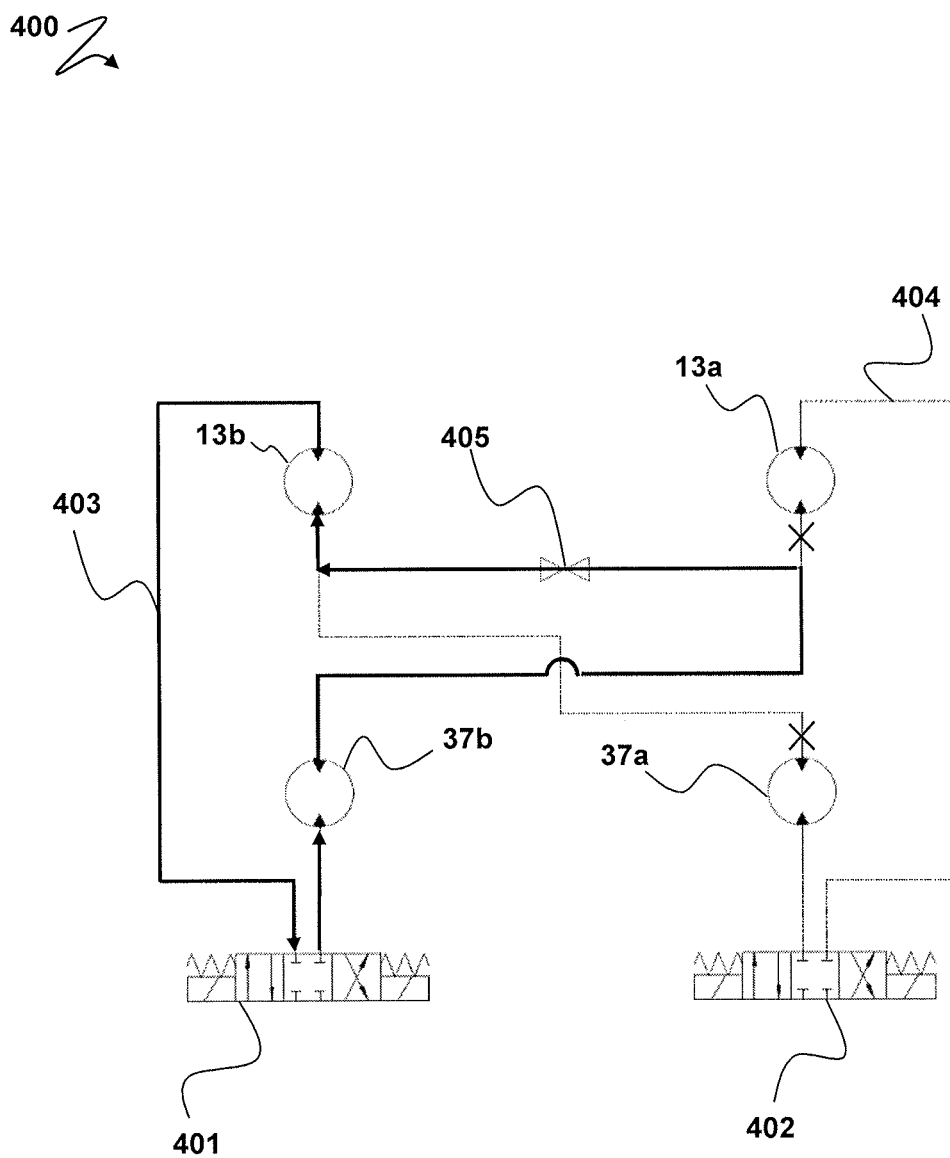
FIG. 4A is a diagrammatic view of an exemplary hydraulic circuit for use in the timber-working system in a first mode of operation.
Figure 4B:
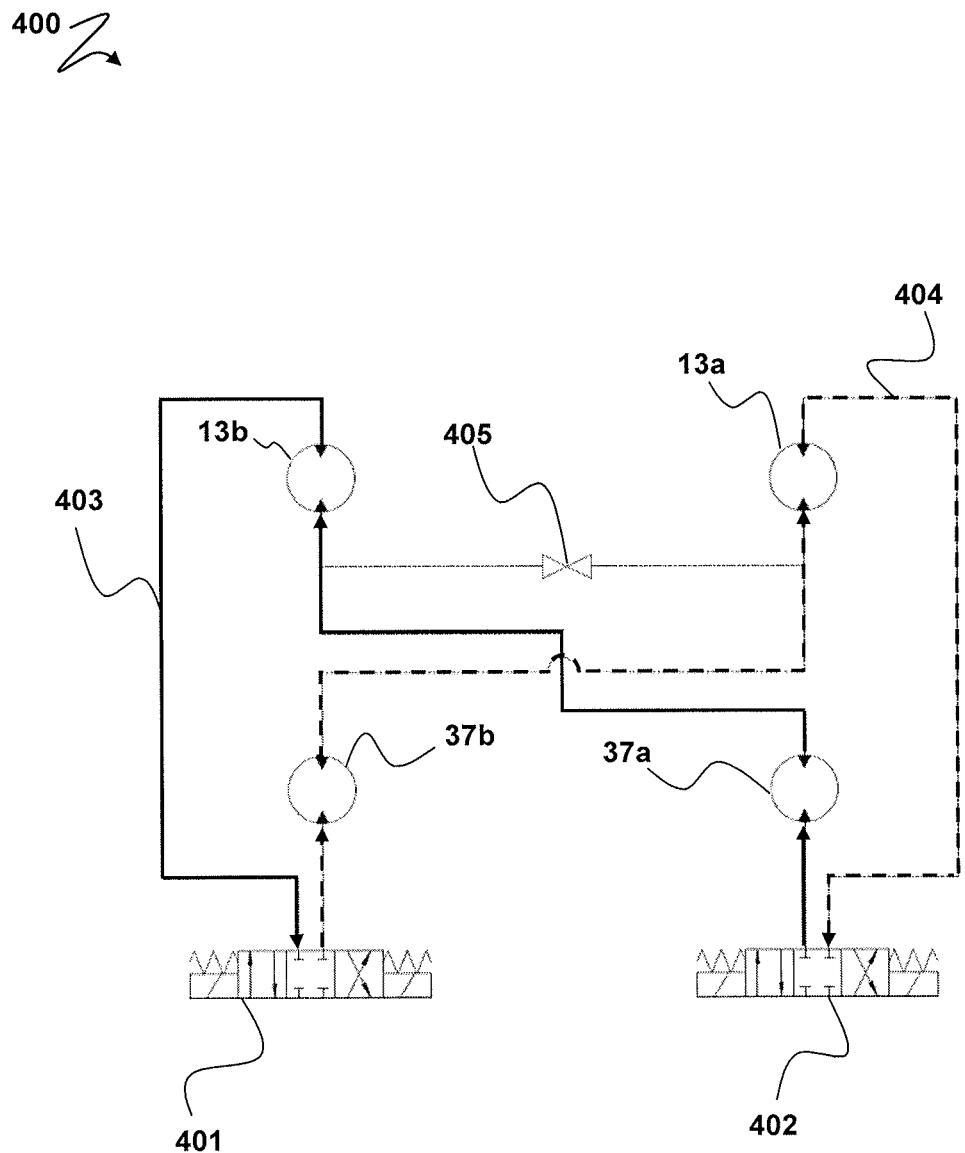
FIG. 4B is a diagrammatic view of an exemplary hydraulic circuit for use in the timber-working system in a second mode of operation.

FIG. 4A and FIG. 4B illustrate an exemplary hydraulic system 400 of the head 4. First and second feed valves 401 and 402 are controllable to connect first and second hydraulic circuits 403 and 404 to a hydraulic fluid power source and reservoir (not illustrated).

In the first hydraulic circuit 403, the drives 37a and 13b are connected in series, while in the second hydraulic circuit 404 the drives 37b and 13a are connected in series.

The two circuits 403 and 404 are interconnected by controllable valve 405 at points between drives 37a and 13b, and drives 37b and 13a, respectively.

Figure 5:
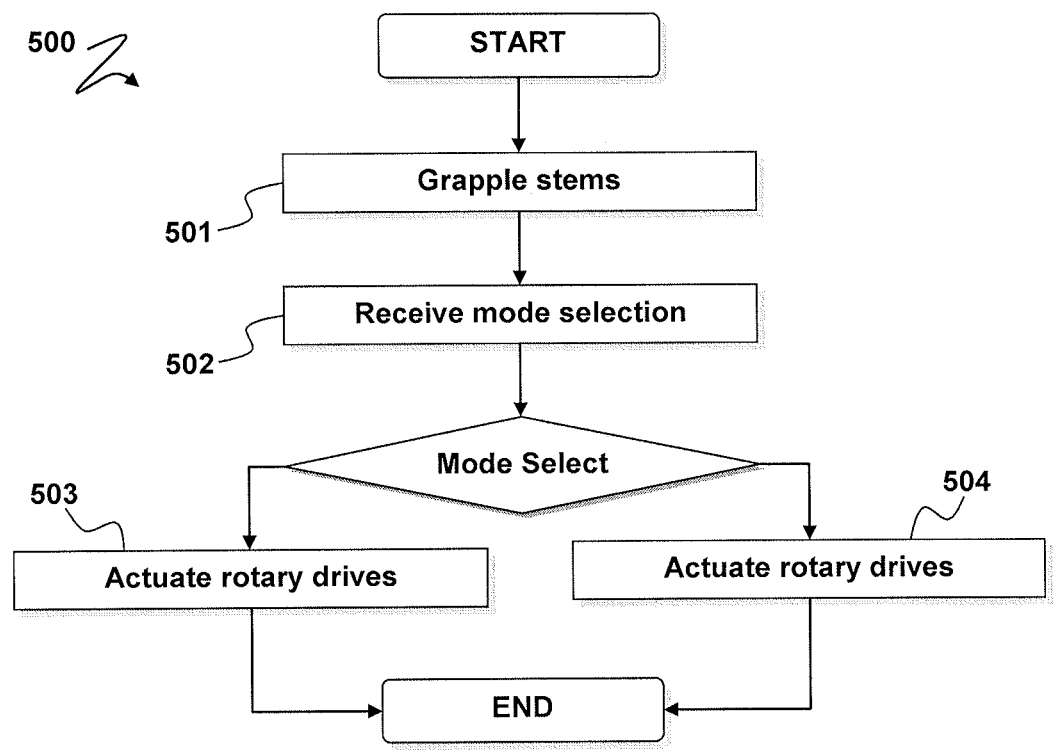
FIG. 5 is a flowchart illustrating an exemplary method for operating the forestry head according to one aspect of the present disclosure.

The control system 30 is configured to implement method 500 of FIG. 5, which will be described with reference to FIGS. 1 through 4B.

In step 501, a human operator operates the operator input device 34 to grasp a first stem and a second stem (stems not illustrated) with the delimb arms 9a and 9b, and feed arms 10a and 10b such that the stems are positioned between the arm-mounted feed wheels 11a and 11b, and frame-mounted feed wheels 12a and 12b. The first stem is positioned to the RH side of the feed axis 14, while the second stem is positioned to the LH side of the feed axis 14.

In step 502, the first controller 31 receives from operator input device 34 a signal indicative of a selection of mode of operation for the head 4. For example, a first mode of operation may be to feed only one of the stems in forward or reverse, while in a second mode of operation both of the stems may be fed simultaneously in the same direction—whether forward or reverse.

In response to that signal, the first controller 31 broadcasts an appropriate request on bus 33, which is received by the second controller 32. The second controller 32 actions the request, controlling the various functions of the head 4 as required.

If the first mode is selected, in step 503, the rotary drives on the desired side of the head 4 are activated. For example, where the LH drives 13b and 37b are to be driven, as illustrated by FIG. 4A: second feed valve 402 is closed, effectively blocking fluid flow into RH drives 13a and 37a from the other side; controllable valve 405 opened, to create a fluid pathway between LH drives 13b and 37b; and first feed valve 401 controlled to deliver hydraulic flow in the desired direction to power the LH drives 13b and 37b in series—thereby achieving substantially the same speed.

If the second mode is selected, in step 504, the desired combination of rotary drives on opposing sides of the head 4 are activated. For example, as illustrated by FIG. 4B: controllable valve 405 is closed, isolating the first and second hydraulic circuits 403 and 404; and first and second feed valves 401 and 402 are controlled to connect to the hydraulic power source and reservoir as required to deliver hydraulic flow in the desired direction to power the drives 13a and 37b, and 13b and 37a in series—thereby achieving substantially the same speed in each set of drives.

Figure 6A:
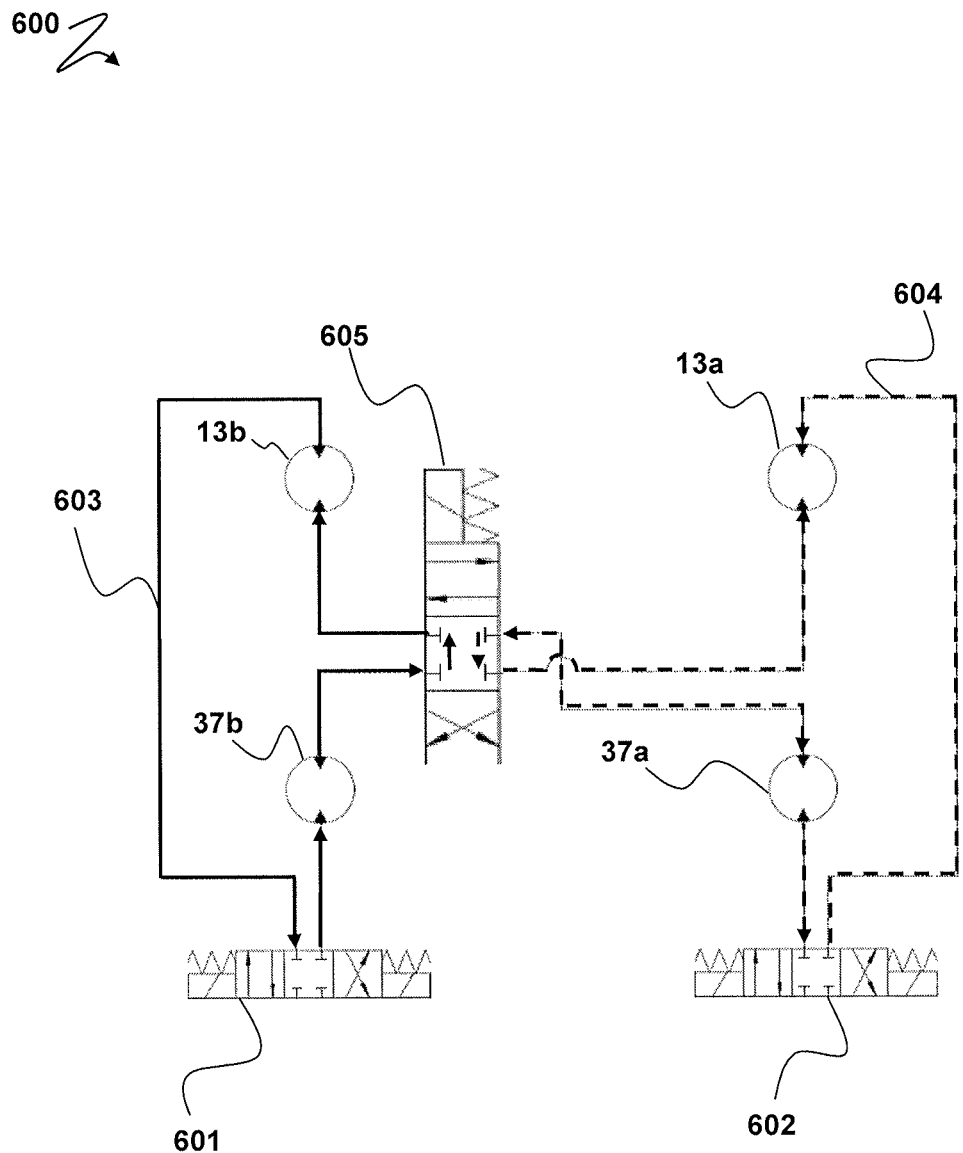
FIG. 6A is a diagrammatic view of another exemplary hydraulic circuit for use in the timber-working system in a first mode of operation.
Figure 6B:
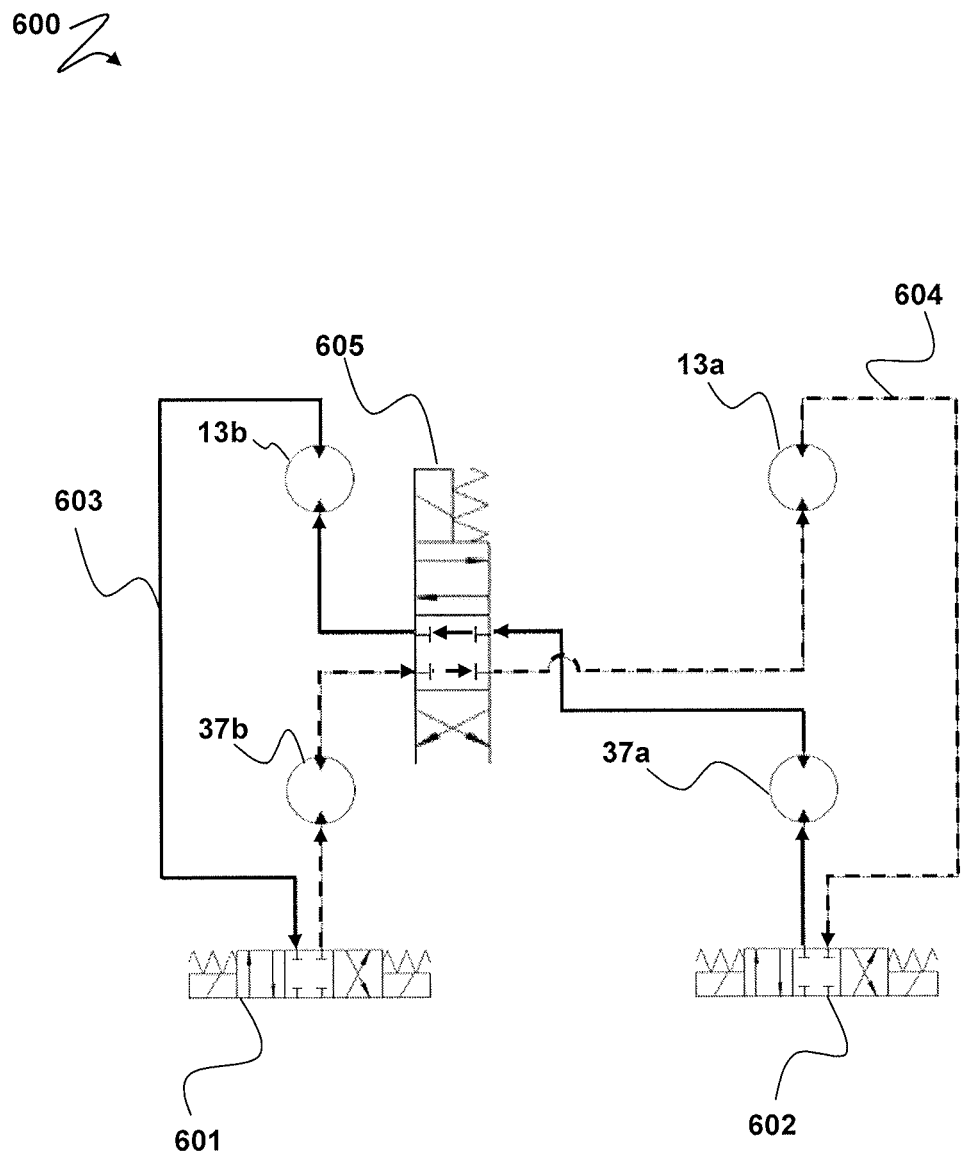
FIG. 6B is a diagrammatic view of another exemplary hydraulic circuit for use in the timber-working system in a second mode of operation.

FIG. 6A and FIG. 6B illustrate another exemplary hydraulic circuit 600. First and second feed valves 601 and 602 are controllable to connect first and second hydraulic circuits 603 and 604 to a hydraulic fluid power source and reservoir (not illustrated).

In the first hydraulic circuit 603, the drives 37a and 13b are connected in series, while in the second hydraulic circuit 604 the drives 37b and 13a are connected in series.

The two circuits 603 and 604 are interconnected by controllable four way valve 605 at points between drives 37a and 13b, and drives 37b and 13a, respectively.

Referring to FIG. 6A, if the first mode is selected—for example where the LH drives 13b and 37b are to be driven in one direction, and the RH drives 13a and 37a are to be driven in the opposite direction: valve 605 is controlled to connect the ports between RH drives 13a and 37a, and the ports between LH drives 13b and 37b; and first and second feed valves 601 and 602 are controlled to deliver hydraulic flow in the desired directions to power the RH drives 13a and 37a in series, and the LH drives 13b and 37b in series—thereby achieving substantially the same speed in the motors on the respective sides.

Referring to FIG. 6B, if the second mode is selected—for example where the drives 13a and 37b are to be driven together, and drives 13b and 37a are to be driven together in the same direction: valve 605 is controlled to connect the ports between drives 13a and 37b, and the ports between drives 13b and 37a; and first and second feed valves 601 and 602 are controlled to connect to the hydraulic power source and reservoir as required to deliver hydraulic flow in the desired direction to power the drives 13a and 37b, and 13b and 37a in series—thereby achieving substantially the same speed in each set of drives.

The entire disclosures of all applications, patents and publications cited above and below, if any, are herein incorporated by reference. Reference to any prior art in this specification is not, and should not be taken as, an acknowledgement or any form of suggestion that that prior art forms part of the common general knowledge in the field of endeavor in any country in the world. Discussion of any references states what their authors assert, and the applicant reserves the right to challenge the accuracy and pertinence of any cited documents.

The disclosure may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the embodiments described herein will be apparent to those skilled in the art. Such changes and modifications may be made without departing from the spirit and scope of the disclosure and without diminishing its attendant advantages. It is therefore intended that such changes and modifications be comprised within the present disclosure.

Aspects of the present disclosure have been described by way of example only and it should be appreciated that modifications and additions may be made thereto without departing from the scope thereof as defined in the appended claims.

What is claimed is:

1. A timber-working device, comprising:
    a frame, comprising a feed axis;
    a drive system configured to feed at least one stem along the feed axis, comprising:
        a first drive arm pivotally attached to the frame on a first side of the feed axis, comprising a first rotary drive having a first wheel,
        a second drive arm pivotally attached to the frame on a second side of the feed axis, comprising a second rotary drive having a second wheel,
        a third rotary drive mounted on the frame on the first side of the feed axis, and having a third wheel, and
        a fourth rotary drive mounted on the frame on the second side of the feed axis, and having a fourth wheel, and
    at least one processor configured to:
        control operation of the rotary drives, such that
            in a first mode the speed of the first wheel and the third wheel is substantially the same, the speed of the second wheel and the fourth wheel is substantially the same, and the speed of the first wheel and the third wheel is controlled separately to the speed of the second wheel and the fourth wheel, and
            in a second mode the speed of the respective wheels of at least two of the rotary drives on opposing sides of the feed axis is substantially the same.

2. A timber-working device as claimed in claim 1, wherein the device comprises a hydraulic system, comprising:
    a first hydraulic circuit connecting the first rotary drive and the third rotary drive in series;
    a second hydraulic circuit connecting the second rotary drive and the fourth rotary drive in series; and
    at least one controllable valve connected between the first hydraulic circuit and the second hydraulic circuit.

3. A timber-working device as claimed in claim 2, wherein the processor is configured to:

in the first mode, control the at least one valve to connect the first rotary drive and the third rotary drive to enable feeding of a stem held by the first wheel and the third wheel along the feed axis.

4. A timber-working device as claimed in claim 2, wherein the processor is configured to:
in the first mode, control the at least one valve to connect the second rotary drive and the fourth rotary drive in series to enable feeding of a stem held by the second wheel and the fourth wheel along the feed axis.

5. A timber-working device as claimed in claim 2, wherein the processor is configured to:
in the second mode, control the at least one valve to connect the first rotary drive and the fourth rotary drive in series when feeding multiple stems simultaneously.

6. A timber-working device as claimed in claim 2, wherein the processor is configured to:
in the second mode, control the at least one valve to connect the second rotary drive and the third rotary drive in series when feeding multiple stems simultaneously.

7. A timber-working device as claimed in claim 1, wherein the processor is configured to:
receive a signal indicative of the speed of each of the wheels;
compare the speeds of the respective rotary drives to determine a speed differential; and
if the speed differential is above a predetermined threshold, control operation of one or more of the rotary drives such that the speed differential is reduced.

8. A method for controlling operation of a timber working device having a frame comprising a feed axis, a drive system comprising a first drive arm pivotally attached to the frame on a first side of the feed axis, comprising a first rotary drive having a first wheel, a second drive arm pivotally attached to the frame on a second side of the feed axis, comprising a second rotary drive having a second wheel, a third rotary drive mounted on the frame on the first side of the feed axis, and having a third wheel, and a fourth rotary drive mounted on the frame on the second side of the feed axis, and having a fourth wheel, the method comprising the steps of:
receiving a signal indicating selection of a first mode or second mode for operation of the rotary drives; and
if the first mode is selected, controlling the rotary drives such that the speed of the first wheel and the third wheel is substantially the same, the speed of the second wheel and the fourth wheel is substantially the same, and the speed of the first wheel and the third wheel is controlled separately to the speed of the second wheel and the fourth wheel; or
if the second mode is selected, controlling the rotary drives such that the speed of the respective wheels of at least two rotary drives on opposing sides is substantially the same.

9. An article of manufacture having computer storage medium storing a non-transitory computer readable program code executable by a computer to implement a method for controlling operation of a timber working device having a frame comprising a feed axis, a drive system comprising a first drive arm pivotally attached to the frame on a first side of the feed axis, comprising a first rotary drive having a first wheel, a second drive arm pivotally attached to the frame on a second side of the feed axis, comprising a second rotary drive having a second wheel, a third rotary drive mounted on the frame on the first side of the feed axis, and having a third wheel, and a fourth rotary drive mounted on the frame on the second side of the feed axis, and having a fourth wheel, the code comprising:
computer readable program code receiving a signal indicating selection of a first mode or second mode for operation of the rotary drives;
computer readable program code controlling, if the first mode is selected, the rotary drives such that the speed of the first wheel and the third wheel is substantially the same, the speed of the second wheel and the fourth wheel is substantially the same, and the speed of the first wheel and the third wheel is controlled separately to the speed of the second wheel and the fourth wheel; and
computer readable program code controlling, if the second mode is selected, the rotary drives such that the speed of the respective wheels of at least two rotary drives on opposing sides is substantially the same.

* * * * *